2,531,480

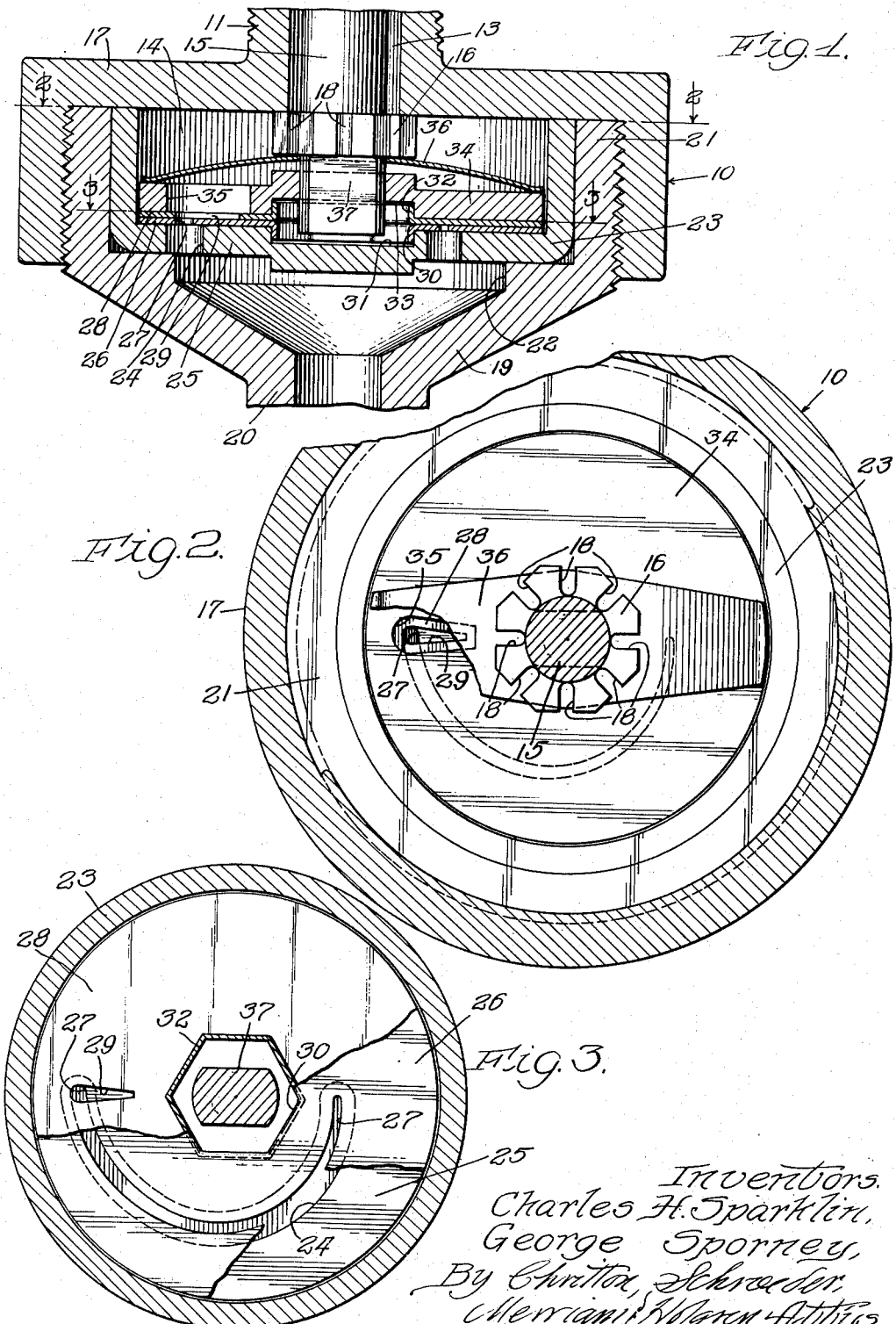
Nov. 28, 1950 — C. H. SPARKLIN ET AL — 2,531,480
VARIABLE DRIP VALVE
Filed Jan. 10, 1946
Inventors.
Charles H. Sparklin,
George Sporney, Patented Nov. 28, 1950

UNITED STATES PATENT OFFICE 2,531,480

VARIABLE DRIP VALVE

Charles H. Sparklin and George Sporney, Chicago, Ill., assignors to Birtman Electric Company, a corporation of Illinois Application January 10, 1946, Serial No. 640,237

8 Claims. (Cl. 251—86)

This invention relates to a variable drip valve.

In many installations it is necessary to use valves having a variable drip. In the past the most common type of variable drip valve has been a needle valve wherein a needle is held in a circular opening, and by adjusting the relative position of the needle to the opening a drip of varying size can be provided. These needle valves, however, are not always satisfactory, because the liquid flow space is of annular shape formed by the needle and the bore of the valve opening. There is opportunity for particles of dust or the like in the liquid to collect in the annular opening and either stop it completely or change the flow. Sometimes a needle becomes damaged so that it is impossible to have a close control of the rate of flow of liquid through the valve.

We have invented a variable drip valve wherein the rate of flow can be easily regulated and the orifice through which the liquid flows is substantially square. If any particles of dust or other foreign matter should gather in the orifice it can be easily dislodged by increasing and then decreasing the size of the orifice. One of the chief advantages of the new valve is that the orifice is not of annular shape but is substantially square so that flow is relatively free. Also there is no needle to obstruct the flow. The new valve comprises a passageway for liquids with a member interposed in said passageway having a slot progressively varying in width from end to end. There is provided a second member superimposed on the first member with the second member having an opening registering with a portion of the slot. There are also provided means for moving one member relative to the other member to provide an orifice of varying dimensions.

One of the chief uses of such a valve is in electric steam irons where water is fed from a container into a heated portion of the iron so that steam can be generated at a controlled rate. When the valve is used on steam irons it is preferred that it be used in an assembly comprising a liquid storage vessel with the variable drip valve attached thereto. Water will then flow from the storage vessel through the variable drip valve to a plate usually positioned over the heating element, and as the drops fall on the heating element steam will be generated, and will flow through a passageway to the sole plate of the iron.

The invention will be described as related to the embodiment shown in the accompanying drawings. Of the drawings Fig. 1 is a vertical section taken substantially through the center of a variable drip valve embodying the invention; Fig. 2 is a horizontal section taken along line 2—2 of Fig. 1; and Fig. 3 is a horizontal section taken along line 3—3 of Fig. 1.

The valve assembly shown in the accompanying drawings comprises a valve 10 having a threaded post 11 which may be attached to a glass bottle or the like for storing water. An annular passageway 13 leads through the post 11 to the interior 14 of the valve. This interior portion is substantially cylindrical. The central portion 15 of the post 11 around which is located the annular passageway 13 extends into the interior of the valve and is formed with an expanded section 16 abutting against the bottom surface of the top 17 of the valve 10. This expanded section is provided with cut-out edge portions 18 communicating with the annular passageway 13.

The valve 10 comprises a funnel-shaped lower portion 19 having a depending stem 20 and a cylindrical top portion 21. The outside of the top portion 21 is threaded and the top member 17 of the valve, which carries the post 11, is screwed thereon to make a tight fit. The interior of the lower portion 19 is provided with a raised circular shoulder 22 having a flat top surface. Within the interior 14 of the valve there is located a cylindrical member 23 having an arcuate opening 24 in its flat bottom 25 communicating with the interior of the funnel-shaped lower portion 19. Within the cylindrical member 23 and resting against the flat bottom portion 25 there is provided a circular disk 26 having an arcuate slot 27 therein communicating with the arcuate opening 24. On top of the circular disk 26 there is provided a second circular disk 28 having a radial slot 29 therein registering with the arcuate slot 27. The second disk 28 is rotatably mounted within the valve and the slots are so positioned that when the second disk 28 is in one position the outer end of radial slot 29 registers with one end of the arcuate slot 27. Then when the second disk 28 is turned 180° the inner end of radial slot 29 registers with the other end of the arcuate slot 27. In order to get a varying orifice of substantially square cross-section, both slots 27 and 29 progressively vary in width. The greatest width of the radial slot 29 is at its outer end, while its narrowest width is at its inner end. The greatest width of the arcuate slot registers with the greatest width of the radial slot, and the narrowest width of the arcuate slot registers with the narrowest width of the radial slot. This operation is provided for by having the center of curvature of the arcuate slot 27 displaced laterally from the center of rotation of the second disk 28.

The first disk 26 is held against rotation by providing a down-turned hexagonal flange 30 in the center that is held in a hexagonal depression 31 in the flat bottom 25 of the cylindrical member 23. The second disk 28 is rotatably held by providing it with an upturned hexagonal flange 32 registering with a hexagonal depression 33 in a relatively thick disk 34 arranged in contacting relationship with the second disk 28. This thick disk 34 has a radial opening 35 which overlies the radial slot 29 and is of greater width. The two disks 26 and 28 are held together by means of a leaf spring 36 extending across the interior 14 of the valve with its ends contacting the thick disk 34 and its central portion contacting the expanded section 16 at the bottom of central post 15. The second disk 28, thick disk 34, spring 36, and expanded section 16 are mounted for rotation by providing a post 37 having flat parallel side portions extending through spring 36 and disk 34. This post 37 extends from the bottom of the expanded section 16. The assembly can be rotated by rotating the central post 15.

In a typical valve the arcuate slot 27 extends over substantially 180° and varies in width from .010 inch at one end to .032 inch at the other end. The radial slot 29 likewise varies from .01 inch to .032 inch with the wide portion being at the extreme outer end and the narrow portion being at the inner end. Thus the wide portions in both slots will register and the narrow portions in both slots will register.

When the rotatable disk 28 is turned to a desired position to give an orifice of predetermined size, and the bottle or other container is filled with water, water will flow down the passageway 13 through the cut-out edge portions 18 of the expanded section 16 and into the interior 14 of the valve. The water flows through the orifice formed by plates 26 and 28 and out through the stem 20. The size of the orifice may be changed by turning the control post 15. The valve in conjunction with a liquid container is useful in many installations, but is particularly useful in steam irons where the rate of flow of water must be carefully controlled in order to control the amount of steam produced.

Having described our invention as related to a typical embodiment of the same, it is our intention that the invention be not limited by the details of the description unless otherwise specified, but rather be construed broadly within its spirit and scope as set out in the accompanying claims.

We claim:

1. A valve comprising a body having a passageway for liquids therein, a hollow post on said body, a plate within said body and having an arcuate slot therein, means for preventing movement of said plate, a rotatable second plate on said first plate and having a slot therein arranged at an angle with the arcuate slot and registering therewith, at least one of said slots varying in width from a maximum at one end to a minimum at the other end, and a stem attached to said rotatable plate and extending through said hollow post for turning said rotatable plate, said stem having at least a portion of its outer surface separated from the inner surface of the hollow post to provide a liquid passageway between said surfaces to the interior of said body.

2. The valve of claim 1 wherein each of said slots vary in width from a maximum at one end to a minimum at the other and said slots are so located that their small ends register when the rotatable plate is in one position and the large ends register when the rotatable plate is in another position.

3. The valve of claim 1 wherein the stem is provided with an enlarged portion larger than the inner cross-sectional area of the hollow post and located on the interior of said body to bear against the portion of the inner surface thereof that is adjacent the hollow post, said enlarged portion having a cut out edge portion communicating with the interior of the hollow post, and there is also provided a spring member bearing against the enlarged section and exerting a force against the adjacent one of the two plates to hold the plates in contact.

4. A valve comprising a body having a passageway for liquid therein, a hollow post on said body, a base member extending across the interior of said body and having an arcuate slot therein, a plate on said base member and having a second arcuate slot therein overlying said first arcuate slot, said second slot having a width at substantially all points less than the width at corresponding points on said first slot, means for fixing said plate against rotation, a second plate overlying said first plate and having a radial slot therein arranged to register with said second arcuate slot, at least one of said second arcuate slot and said radial slot in said plates varying in width from a maximum at one end to a minimum at the other end, a second base member overlying the second plate and having a radial slot overlying the radial slot in the second plate, said base member radial slot having a width at substantially all points greater than the width at corresponding points on said plate radial slot, means for locking the second plate and the second base member together for rotation as a unit about a substantially common axis, and means for rotating said unit, said plate radial slot and said plate arcuate slot being arranged so that one end of the radial slot registers with one end of the arcuate slot when the second plate is in one position and the opposite ends register when the second plate is in another position.

5. The valve of claim 4 wherein there is provided a stem on said unit extending through the hollow post with said stem being rotatable for rotating said unit, said stem having at least a portion of its outer surface separated from the inner surface of the hollow post to provide a liquid passageway between said surfaces to the interior of said body.

6. The valve of claim 4 wherein there is provided a stem on said unit extending through the hollow stem on said post being rotatable for rotating said unit, said stem having at least a portion of its outer surface separated from the inner surface of the hollow post to provide a liquid passageway between said surfaces to the interior of said body, and there is provided an enlarged portion larger than the inner cross-sectional area of the hollow post and located on the interior of said body to bear against the portion of the inner surface thereof that is adjacent the hollow post, said enlarged portion having a cut out edge portion communicating with the interior of the hollow post, and there is also provided a spring member bearing against the enlarged section and exerting a force against the second base member to hold the two plate members in contact, said spring member having a width less than the internal diameter of said body.

7. A valve comprising a body having a passageway for fluids therethrough, a relatively thick member extending across said passageway and having an arcuate slot therein, a relatively thin member against said thick member and having an arcuate slot therein communicating with the slot of said thick member, said thick member slot having a width at substantially all points at least as great as the width of said thin member slot at corresponding points, a second relatively thin member against said first thin member and having a radial opening normally registering with said arcuate slot in said first thin member, a second relatively thick member against said second thin member and having a radial opening communicating with the opening in said second thin member, said second thick member opening having a width at substantially all points at least as great as the width of said second thin member opening at corresponding points, and means for rotating one of said first and second thin members and its corresponding thick member as a unit with respect to the other of said thin members and its corresponding thick member, at least one of said slot and opening in said thin members tapering from end to end for providing an orifice of varying size.

8. The valve of claim 7 wherein each of the slot and the opening in said thin members taper from end to end with the large ends registering when the thin members are in one relative position and the small ends registering when the thin members are in the opposite relative position.

CHARLES H. SPARKLIN.
GEORGE SPORNEY.

REFERENCES CITED

The following references are of record in the file of this patent:

UNITED STATES PATENTS

| Number | Name | Date |
|---|---|---|
| 902,264 | Stevens | Oct. 27, 1908 |
| 1,373,119 | Dyer | Mar. 29, 1921 |
| 1,477,328 | Dyson | Dec. 11, 1923 |
| 1,751,591 | McCloskey | Mar. 25, 1930 |
| 2,313,382 | Kistner | Mar. 9, 1943 |